May 7, 1957  F. C. HOLTZ  2,791,118
TEMPERATURE CORRECTING REGISTER FOR GAS METERS
Filed Oct. 8, 1954  2 Sheets-Sheet 1
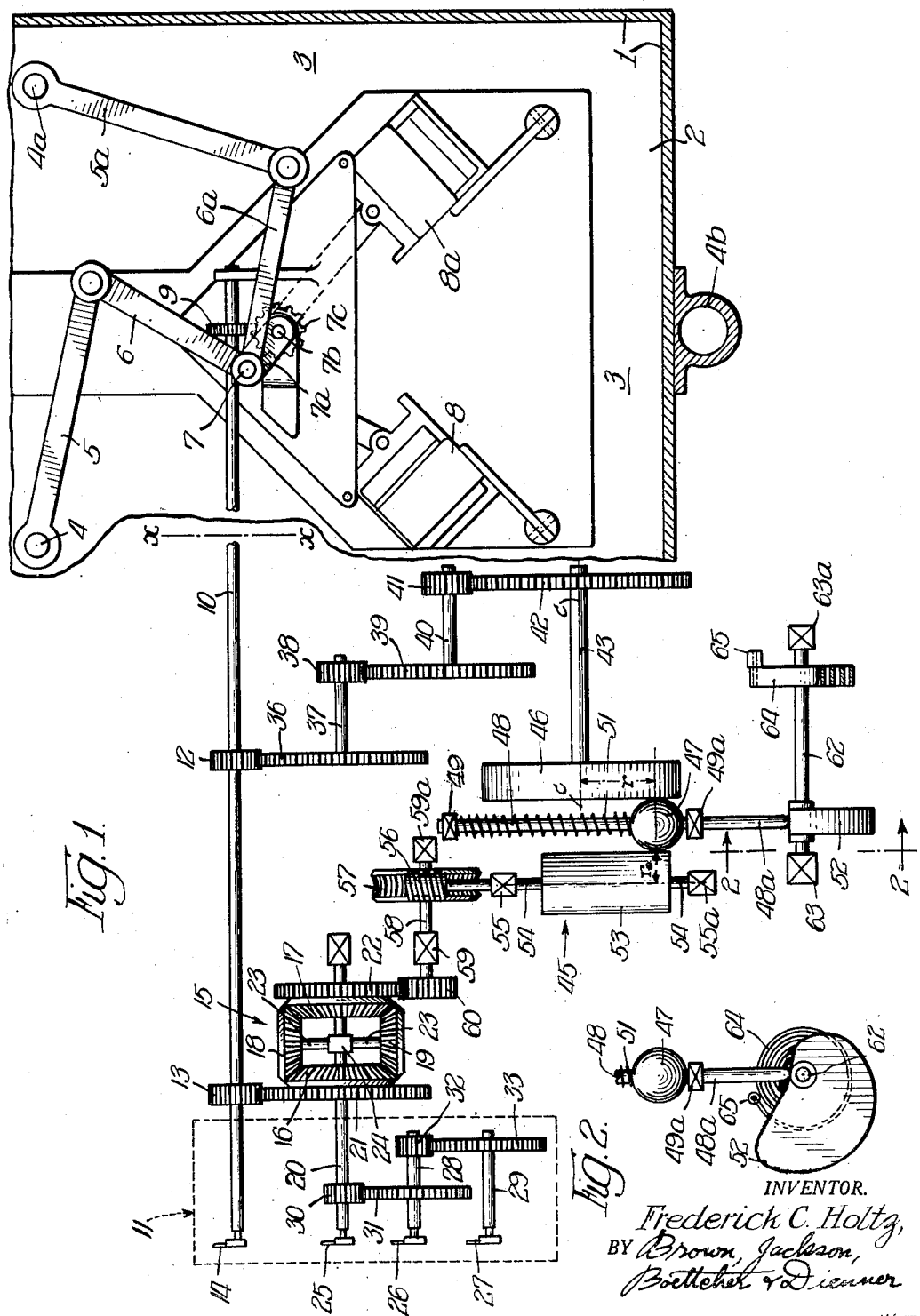
INVENTOR.
Frederick C. Holtz,
BY Brown, Jackson,
Boettcher & Dienner May 7, 1957 F. C. HOLTZ 2,791,118
TEMPERATURE CORRECTING REGISTER FOR GAS METERS
Filed Oct. 8, 1954 2 Sheets-Sheet 2
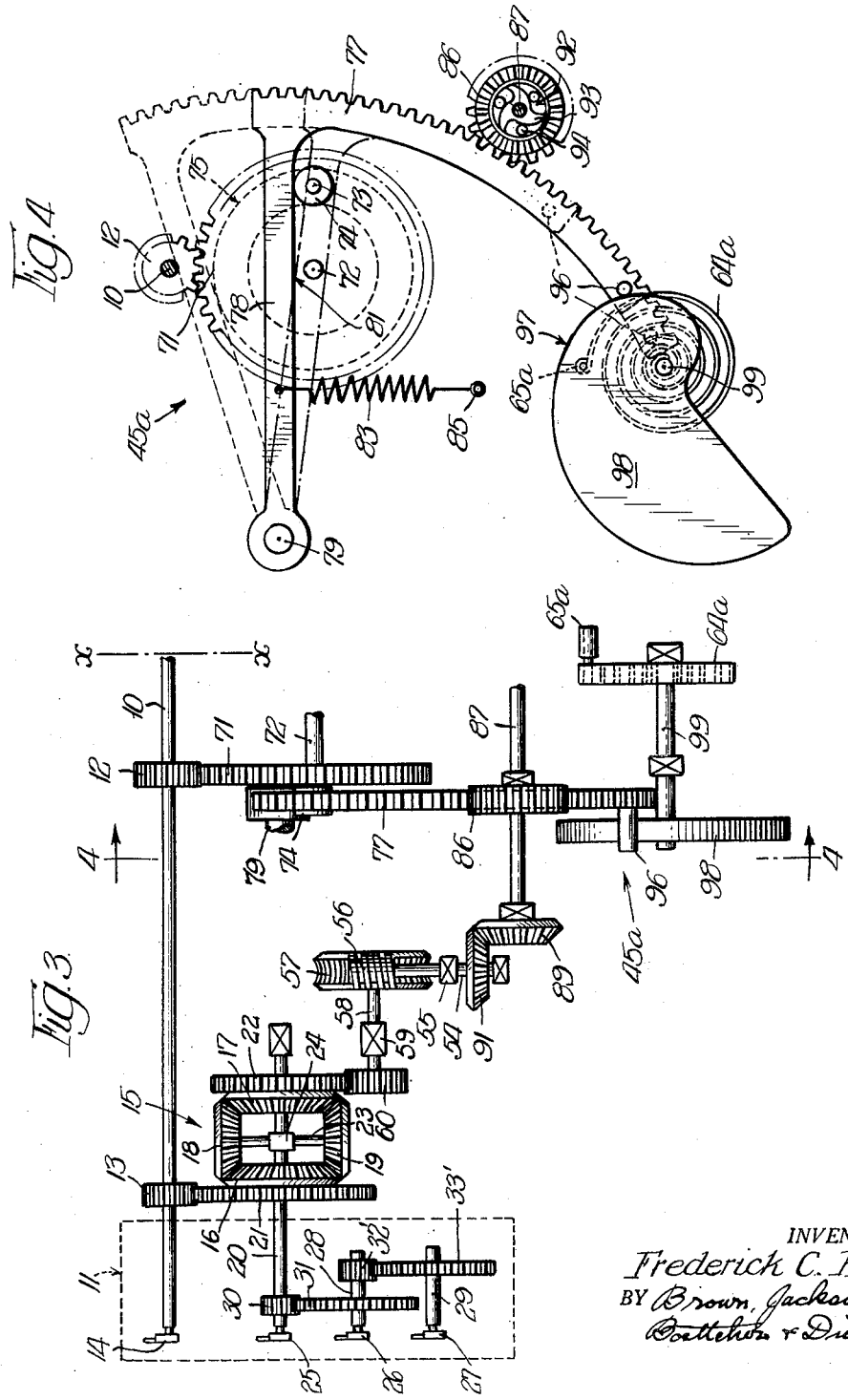
INVENTOR.
Frederick C. Holtz,
BY Brown, Jackson,
Boettcher & Dienner
Attys.

United States Patent Office 2,791,118
Patented May 7, 1957

2,791,118

TEMPERATURE CORRECTING REGISTER FOR GAS METERS

Frederick C. Holtz, Springfield, Ill., assignor to Sangamo Electric Company, Springfield, Ill., a corporation of Illinois Application October 8, 1954, Serial No. 461,136

6 Claims. (Cl. 73—233)

This invention relates generally to a device for measuring and registering the flow of gases.

More particularly, the present invention concerns an improved register section for a conventional displacement type of gas meter which is adapted to correct for temperature changes and to obviate errors in the measurement of flowing gases resulting from changes in temperature.

In the commercial sale of natural or manufactured gas for heating and other related household applications as well as industrial applications, it is the normal custom to utilize a conventional type of displacement meter or measuring device which meters the gas on the basis of volumetric rate or flow. Such a meter does not correct the volumetric measurement for changes in pressure or temperature to which the gas may be subject. An ideal meter for the measurement of gas would be one in which the volume recorded would be reduced to a constant basic pressure, temperature and calorific value in B. t. u.'s per cubic foot. In most instances it is possible to maintain uniform pressures and calorific values in the gases being metered so that relatively little error beyond acceptable limits, results from these two factors in the use of presently known volumetric gas measuring device.

When considering temperature changes and fluctuations, however, the characteristic of the gas and the operation of the meter is not so easily controlled. For example, in the more northerly latitudes of the United States, temperatures may vary from −20° F. in winter to 120° F. in summer. Gas meters of presently known designs are inherently volume measuring devices irrespective of the temperature of the gas flowing therethrough. When such volumes are corrected to some standard temperature, such as 70° F., the errors may be as high as 29%. Such an error in the registration of the gas is obviously not permissible. As a result, present gas meters are generally installed in locations or areas, such as basements, where the temperature variation will not be quite so violent, so as to minimize the difficulty noted.

Briefly, the present invention is directed to the improvement of the register section of a conventional volumetric displacement type of gas meter. Particularly, I have devised a new and improved mechanism whereby differentials of temperature may be taken into account in the actuation of the gas meter register section to the end that measurement of the volume flow of gas is automatically corrected in accordance with variations of temperature.

The main object of my present invention is to provide a new and improved register for use in gas meters and the like which will automatically and continuously correct the register readings for changes in temperature.

Another object of my invention is to provide a new and improved register for gas meters and the like which will continuously correct the headings of the register for changes in temperature to the end that such readings will be corrected to one standard temperature irrespective of the temperature changes to which the gas may be subjected.

A still further object of this invention is to provide a new and improved mechanism for modifying the register of a conventional volumetric or displacement type of gas meter which embodies certain improved mechanisms and operating principles for automatically and continuously correcting the gas meter register for changes in temperature.

The above and further objects, features and advantages of this invention will be recognized by those familiar with the art from the following detailed description and specification therefor. Particular understanding of this invention will be gained with reference to the illustration of two forms of means or mechanisms designed to carry out the above outlined intents and objects as shown in the accompanying drawings.

In the drawings:

Figure 1 is a schematic representation of one form or embodiment of mechanism for a gas meter register constructed in accordance with the principles and concepts of my invention;

Figure 2 is a detail sectional view taken on the plane of the line 2—2 of Figure 1;

Figure 3 is a schematic representation of a modified embodiment of the invention; and Figure 4 is a transverse sectional view taken on the plane of the line 4—4 of Figure 3.

Referring first to Figure 1 of the drawings, the right hand portion of this figure (lying to the right of the dash-dot line $x$—$x$) illustrates fragmentarily one conventional design of operating mechanism, embodying typical flag rods, flag arms, links, etc., for transmitting motion from the gas measuring bellows of the meter to the indicating register. The meter is typically represented by a Glover tin type of meter, but it will be understood that the invention is also applicable to other types of meters. The sectioned side walls 1 represent an enclosure 2 at the top of the meter, commonly referred to as the "gallery chamber," which is separated from the gas measuring bellows lying directly below by a "gallery table" or platform 3. The measuring bellows of the meter are operatively connected to oscillate a pair of vertical shafts or flag rods 4 and 4a passing upwardly through the gallery table 3 into the gallery chamber 2. Through the operation of conventional well-known apparatus, the movement of the measuring bellows, in response to the flow of gas from the supply pipe to the service pipe of the meter, causes these two flag shafts 4 and 4a to be oscillated back and forth at rates proportional to the rate of gas flow. Mounted on the upper ends of the flag shafts 4 and 4a to oscillate therewith are flag arms 5 and 5a which have their oscillating ends pivotally connected with links 6 and 6a. These links have their other ends pivotally connected to a wrist pin 7 extending upwardly from a revolving crank 7a. This crank 7a is mounted on the upper end of a vertical shaft 7b, and the operating relation is such that the back and forth oscillations of the flag rods 4 and 4a impart a unidirectional rotation to the vertical shaft 7b. Below the crank 7a, the shaft 7b is suitably journaled in upper and lower bearing brackets stationarily mounted in the gallery chamber, and the lower portion of this shaft 7b is operatively connected through conventional crank mechanism with the typical slide valves 8 and 8a which govern the gas flow through the bellows. The rotating motion of the shaft 7b is also transmitted to the indicating register through a worm wheel 7c mounted on the shaft 7b and meshing with a worm wheel 9. The worm wheel 9 is mounted on a horizontal shaft 10 which extends forwardly to the indicating register diagrammatically shown at 11, usually located in the front wall of the gallery chamber, this shaft 10 being frequently referred to as the index or proving circle shaft. The preferred embodiment of my invention is directed to a form of temperature compensating mechanism which exerts its temperature correcting influence at a point between the worm wheel 9 and the register 11. That is to say, this preferred embodiment of temperature compensating mechanism is operative in the train of motion transmitting parts diagrammatically illustrated to the left of the plane x—x of Figure 1.

This portion of the index or proving head shaft 10 carries a pair of spaced pinions 12 and 13, and at its extremity this index shaft preferably mounts an index pointer 14 which revolves over the register face of the meter to indicate a small number of cubic feet of gas flow per revolution, as is well known to those skilled in the art. The readings of this first pointer 14 are preferably not temperature compensated. The proving head shaft 10 must measure the cubic feet of gas delivered, and the uncompensated first pointer 14 affords a calibration device for making comparison between a shop standard and the rate of rotation of this proving head shaft 10 in each meter undergoing test.

The temperature compensating mechanism comprises a system of differential gearing, indicated in its entirety at 15. This differential gearing comprises a pair of spaced sun gears 16 and 17 separated by planetary gears 18 and 19, the differential gearing being supported on an axial main shaft 20. The left hand sun gear 16 is joined to or compounded with a spur gear 21 which is in meshing engagement with the pinion 13 which rotates constantly with the index shaft 10. The right hand sun gear 17 is joined to a spur gear 22 which receives a temperature corrected drive from the other pinion 12 on the index shaft 10, as will be later described. The two sun gears 16 and 17 are supported for independent free rotation on the shaft 20, or on suitable bearings coaxial thereof. The two planetary gears 18 and 19 are supported at the outer ends of radially extending cage shafts 23, these shafts being mounted in a hub or cage member 24 which is rigidly coupled to the shaft 20, from which it will be seen that the rotation of the shaft 20 corresponds directly to the rate of rotation that the planetary gears 18 and 19 swing their mounting shafts 23 around the axis of the main shaft 20.

At the outer or left hand end of shaft 20, as viewed in Figure 1, is mounted a second index pointer 25 rotating over the face of a related dial of the register 11. This pointer 25 generally indicates the passage of a volume of gas which, except for a temperature correction factor, is a predetermined multiple of the indication afforded by pointer 14; as, for example, it may indicate the passage of 1000 cubic feet of gas per revolution of shaft 20. Additional pointers 26 and 27, supported on parallel shafts 28 and 29 respectively, are driven in the usual manner from a spur gear 30 mounted on shaft 20 through a gear train comprising gear members 31, 32 and 33. Index pointers 26 and 27 indicate predetermined multiples of the indication of pointer 25; as for example pointer 26 may indicate the passage of 10,000 cubic feet of gas per revolution of shaft 28, while index pointer 27 may indicate the passage of 100,000 cubic feet of gas per revolution of shaft 29, according to conventional practice.

It will be understood that with the right hand sun wheel 17 stationary, the gearing between spur pinion 13 and the pointers 25, 26 and 27 will cause the indication on the register face of the meter of the total cubic feet of gas passing through the meter irrespective of any temperature change. The introduction of the differential gearing 15, and particularly the introduction of relative motion between the two sun gears 16 and 17, however, causes the introduction of a correction to the readings of the pointers 25, 26 and 27, so that the recorded amounts will represent the gas volume delivered at some fixed or reference temperature. That is to say, a temperature differential is introduced between the proving head shaft 10 and the volumetric indications established by the pointers 25, 26 and 27 of the register 11. The introduction of this correction for temperature change is accomplished in the following manner:

The pinion 12 mounted on the index shaft 10 is coupled through successive stages of gearing and shafts 36 to 42 inclusive to a shaft 43 which transmits a drive to an integrating mechanism, designated 45 in its entirety. Mounted on shaft 43 is a friction disc 46 which rotates continuously with the index shaft 10 at a ratio established by the speed reduction gearing 36—42. The friction face of the disc 46 is adapted to transmit a friction drive to a spherical ball 47 which is pinned, or otherwise secured fast, on a shaft 48 mounted for rotating and sliding motion in upper and lower bearings 49, 49a. This rotatable and slidable shaft 48 extends radially of the friction disc 46 in parallel spaced relation to the friction face of the disc. A compression spring 51 surrounds the shaft 48 between the upper side of the spherical ball 47 and the under side of the upper bearing 49, this spring normally tending to slide the ball 47 and shaft 48 in a downward or outward direction with respect to the center of the friction disc 46, substantially to the position illustrated in Figure 1. The shaft 48 is provided with a cam follower extension 48a extending down below the lower bearing 49a. This cam follower extension is held pressed down in continuous contact with the periphery of a temperature responsive cam 52 by the action of the compression spring 51. As will be later described, this cam 52 assumes different angular positions in response to different ambient temperatures, whereby the cam follower 48a is raised or lowered for placing the ball 47 at different radial points across the face of the friction disc 46 for transmitting different rates of rotation to the ball 47.

The rotation of the ball 47 is transmitted in turn to a relatively long driven cylinder or roller 53 with which the opposite side of the ball has continuous frictional contact. This friction roller 53 extends parallel to the front face of the friction disc 46 and parallel to the rotatable and slidable rod 48, so that the ball will have continuous engagement with the cylinder roller along a line parallel to the roller axis. The roller 53 is secured to a shaft 54 journaled in spaced bearings 55, 55a, and mounted on this shaft 54 is a worm 56. The latter has continuous mesh with a worm wheel 57 secured to a shaft 58 journaled in bearings 59, 59a and carrying a pinion 60. This pinion 60 has continuous mesh with the spur gear 22 that is secured to the right hand sun gear 17. From the description thus far, it will be seen that translational motion of the ball 47 radially across the face of the friction disc 46 serves to vary the speed of rotation of the ball, and thus the speed of rotation transmitted through cylinder 53, worm gearing 56, 57 and spur gear 60 to the right hand sun gear 17 of the differential system 15.

Referring again to the temperature responsive positioning of the cam 52, this cam is mounted on the rotatable shaft 62 suitably supported in bearings 63, 63a. The shaft 62 is rotated in response to temperature change by a bimetallic spiral spring 64 which has its inner end anchored to the shaft 62 and has its outer end anchored to any fixed point of attachment 65. The arrangement of the bimetallic spring 64 and the shape of the peripheral edge of cam 52 are such as to cause the ball 47 to contact the friction driving disc 46 at an appropriate radius of the disc and at the appropriate side of its rotative center line c—c, such that the drum 53 will rotated in the proper direction and at the correct speed corresponding to the desired correction to be applied to the dials 25, 26 and 27 in response to temperature change. In the preferred arrangement, the range of sliding movement of the ball 47 is preferably restricted to one side of the rotative center line c—c of the disc 46, but the invention also contemplates both plus and minus corrections, according to which the ball 47 could operate on both sides of the center line c—c for rotation in opposite directions. Figures 1 and 2 show the ball 47 substantially in the position is occupies under low temperature conditions. As the temperature rises, the bi-metallic spiral spring 64 expands and rotates the cam 52 in a radius increasing direction, i. e. in a counterclockwise direction as viewed in Figure 2. This gradually moves the ball 47 inwardly across the face of the friction disk 46 so that the ball transmits a gradually reducing speed ratio from disk 46 to cylinder 53 as the temperature of the gas rises.

In Figures 3 and 4 I have illustrated a modified form of temperature responsive integrating mechanism operative between the proving shaft pinion 12 and the differential gear set 15. The indicating register 11 is shown as having the same driving arrangement previously described, with the first pointer 14 actuated directly by the proving head shaft 10 for meter calibrating purposes, and with the other pointers 25, 26 and 27 responding to the temperature correction as established through the differential gear set 15.

Referring now to the modified integrating mechanism, designated 45a in its entirety, this comprises a relatively large gear 71 which meshes with the pinion 12 to be driven constantly by the rotary motion of the proving head shaft 10. The gear 71 is suitably mounted on any preferred arrangement of bearing shaft 72 extending rearwardly from one face of the gear 71; and projecting from the opposite face of this gear is a stud 73 carrying a roller 74. As the gear 71 rotates concurrently with the rotation of the proving head shaft 10, the roller 74 is caused to revolve through a circular orbit 75 which is caused to impart different degrees of oscillatory movement to a large sector gear 77. This sector gear 77 is carried on arm 78 which is mounted on a fixed pivot axis 79. The roller 74 in its rotation through the circular orbit 75 has rolling or wiping contact along the lower edge 81 of the sector arm 78 for imparting an oscillatory movement to the sector gear 77. This trackway surface 81 along the lower edge of the arm 78 is normally maintained in continuous engagement with the gear driven roller 74 by any suitable spring means, such as a tension spring 83 having one end connected to the arm 78 and having its other end fastened to a fixed point of attachment 85.

The gear teeth of the oscillating sector 77 mesh with a spur gear 86 mounted on a shaft 87. The shaft 87 carries a bevel gear 89 which meshes with a companion bevel gear 91 secured to the shaft 54. This shaft 54 is operatively connected through the same previously described arrangement of worm and worm wheel 56, 57 and spur gear 60, with the gear 22 connected to the right hand sun gear 17 of the planetary system.

Interposed in this train of motion transmitting parts between the gear 86 and the worm 56 is a one-way drive or ratcheting arrangement which will transmit rotary motion to the worm 56 while the sector gear 77 is oscillating in one direction, but will not transmit rotary motion to said worm while the sector gear is oscillating in the other direction. I have illustrated this one-way drive mechanism in the form of an overrunning ball clutch 92 embodied directly in the hub structure of the gear 86 between this gear and the shaft 87. As shown in Figure 4, this overrunning ball clutch has any conventional arrangement of cam surfaces 93 and cooperating friction balls which exert a clutching action for transmitting rotation from the gear 86 to the shaft 87 when the gear is rotated in one direction, but which unclutch and do not transmit rotation to the shaft when the gear 86 is rotated in the other direction.

The temperature correction of the integrating mechanism 45a is effected by controlling the amplitude of oscillation of the sector gear 77 in response to change of temperature. In the exemplary arrangement illustrated, this is accomplished by providing a stop pin, or other stop surface 96, at the lower or outer end of the sector adapted to have abutment against the peripheral surface 97 of a cam 98 mounted on shaft 99. Connected to this shaft 99 is a bi-metallic spiral spring 64a having its inner end connected to the shaft 99 and having its outer end connected to a fixed anchoring pin 65a. This bi-metallic spring angularly positions the cam 98 in response to thermal ambients in substantially the same manner that the bi-metallic spring 64 positions the cam 52 of the previously described embodiment. It will thus be seen that the surface 97 of the cam 98 constitutes a stop surface having a radius which varies pursuant to temperature change; according to which the amplitude of oscillation of the gear sector 77 in response to the orbital movement of the roller 74 is increased or decreased for temperature compensation. For example, with the cam 98 in the position illustrated in Figure 4, the permissible amplitude of oscillation of the sector gear 77 is between the intermediate full line position and the upper dotted line position; the cam surfaces 97 predetermining the intermediate full line position, and the orbital path of the roller 74 carrying the sector up to the upper dotted line position. Rotation of cam 98 in a clockwise direction, in response to temperature change, will present a stop surface 97 of continuously increasing radii until, at the maximum radius, the gear sector 77 will have a slight minimum amplitude of oscillation into and out of the uppermost position indicated in dotted lines; or the design may be such that the gear sector will be held in this non-oscillating dotted line position by the maximum radius of the cam 98. Figure 4 shows the cam 98 substantially in the position it occupies under relatively low temperature conditions. As the temperature rises, the bi-metallic spring 64a expands and rotates the cam 98 in a radius increasing direction, i. e. in a clockwise direction as viewed in Figure 4. This operates through the pin 96 to decrease the amplitude of oscillation of the gear sector 77 so that the amount of rotative movement transmitted to shaft 87 decreases as the temperature rises.

It will be seen from the foregoing that the embodiment shown in Figures 1 and 2 and the embodiment shown in Figures 3 and 4 both accomplish the same end result of transmitting a temperature controlled rotary movement to the right hand sun gear 17 of the planetary gearing 15, the embodiment illustrated in Figures 1 and 2 transmitting a rotary movement to this sun gear which is substantially continuous, but of a variable speed, whereas the embodiment illustrated in Figures 3 and 4 transmits a rotary motion to this sun gear 17 which is of intermittent or pulsing nature, with the length of the rotary pulses depending upon the temperature factor.

From the foregoing, it will be appreciated that I have herein described a first preferred and a modified form of device for introducing a temperature correction to a conventional displacement type of gas meter. Once the meter is so equipped, it may be installed in any desired location without regard to temperature changes in the gas, since such changes will be automatically compensated for in the meter, which means a marked advantage over previous gas meters of the type described.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a gas meter the combination for an improved register section, comprising, a proving head shaft, a pair of spaced pinion gears mounted on said proving head shaft, a second shaft mounted parallel to said proving head shaft, a third shaft mounted parallel to said second shaft, a fourth shaft mounted parallel to said third shaft, a first pointer means driven by the proving head shaft, a second pointer means driven by said second shaft, a gear train means coupling one of said pinion gears with said third shaft whereby said third shaft is rotated in response to rotation of said proving head shaft, a differential gear system mounted on said second shaft and having one end thereof driven by the other of said pinion gears, said differential system serving to rotate said second shaft, a variable speed drive means driven by said third shaft and having driving connection with the other end of said differential gear system, cam means mounted on said fourth shaft for regulating the output speed of said drive means thereby to vary its driving of said differential means, and a bimetallic spiral spring connected to said fourth shaft and arranged to rotatably drive the same in response to changes in temperature whereby the rotation of said second pointer means is corrected for temperature changes.

2. In a gas meter of the class described, the combination for an improved register section, comprising, a proving head shaft for driving a first index pointer, a pair of pinion gears mounted on said proving head shaft, a second shaft for driving a second index pointer, a differential gear train mounted on said second shaft and having driving connection at one end with one of said pinion gears, a third shaft, a reduction gear train interconnecting said third shaft with the other of said pinion gears whereby said third shaft is rotatably driven in response to the rotation of said proving head shaft, a variable speed drive means driven by said third shaft, a fourth shaft, a bimetallic spring member connected to said fourth shaft for rotatably driving the same in response to temperature change, and a cam member rotatably driven by said fourth shaft and having connection with said varaible speed drive means for regulating the output thereof, said variable speed drive means having driving connection with the other end of said differential means whereby the movement of the second index pointer is regulated in response to fluctuations in thermal ambients.

3. In a gas meter of the class described, the combination for an improved register section comprising, a proving head shaft having a first index pointer rotatable therewith, a pair of gear means mounted on said proving head shaft, a second shaft having an index pointer means driven thereby, a differential gear system mounted on said second shaft for rotatably driving the same, said differential gear system having driving connection at one end with one of the said gear means on said proving head shaft, a third shaft supporting a friction disc at one end, a reduction gear system interconnecting said third shaft with the other of said gear means on said proving head shaft, a friction ball member mounted adjacent said friction disc member and in engagement with one face of the latter member, said ball member being rotatable upon an axis member movable radially with respect to said friction disc member, a cylinder member mounted for rotation about an axis paralleling the rotational axis of said ball member, said cylinder member having frictional driving engagement with said ball member, a worm and worm gear means rotatably driven by said cylinder member, and means interconnecting said worm and worm gear means with the other end of said differential system, a fourth shaft, a cam member mounted at one end of said fourth shaft, said cam member serving to vary the radial positioning of said ball member with respect to the rotational axis of said disc member, and a bimetallic coil spring means having one end anchored and its other end connected to said fourth shaft member whereby said fourth shaft is rotatably driven in response to thermally induced opening and closing movements of said coil spring, the arrangement being such that the differential system is driven at one end in response to fluctuations of thermoambients and at its opposite end in direct response to rotation of said proving head shaft, the total effect of driving said differential serving to regulate the rotation of said second shaft and the indication of said second index pointer means.

4. In a gas meter of the class described, the combination for an improved register section, comprising, a proving head shaft, first index pointer means rotatably driven by said proving head shaft, a second shaft, second index pointer means rotatably driven by said second shaft, a differential gear means mounted on said second shaft and serving to rotate same, means interconnecting one end of said differential means with said proving head shaft whereby the same is rotatably driven at one end in response to rotation of said proving head shaft, a variable speed drive means driven by said proving head shaft, means interconnecting the output end of said variable speed drive means with the other end of said differential means, a cam means arranged to regulate the output speed of said drive means, an axle means supporting said cam means, a thermally responsive means mounted about said axle means and arranged to rotatably drive the same and said cam means in response to changes in temperature; the arrangement being such that the resultant effect of driving one end of said differential means from the proving head shaft and its opposite end from said variable speed drive means serves to correct the rotation of said second shaft and said second index pointer means according to changes in temperature.

5. In a gas meter of the class described, the combination comprising, a proving head shaft, a first index pointer means rotatably driven by said proving head shaft, an index shaft, a second index pointer means driven by said index shaft, a differential gear system coupled to said index shaft and arranged to rotatably drive the same, means for driving one end of said differential system in response to rotation of said proving head shaft, a gear sector member mounted for pivotal movement about its one end, a driving wheel mounted adjacent said gear sector, a roller member mounted on one face of said driving wheel for engaging said gear sector, means driving said drive wheel in response to rotation of said proving head shaft, the arrangement of said gear sector and drive wheel being such that said gear sector is oscillated arcuately in response to rotation of said drive wheel, spring means biasing said gear sector normally in one direction, a cam means disposed adjacent said gear sector and serving to engage the same thereby to limit its stroke in said one direction, a bimetallic spring member having one end anchored and its opposite end engaged with a drive shaft for rotatably driving the latter, said drive shaft means serving to rotatably drive said cam means, and a take-off means driven by said sector and including a unidirectional clutch means for transmitting the impulses of said sector to the other end of said differential means; the arrangement being such that the combined driving of said differential means from said proving head shaft and said sector serves to regulate the rotation of said index shaft and second index pointer means in response to changes in temperature.

6. In a gas meter, the combination of flag rods adapted to oscillate in response to operation of measuring bellows in the meter, a proving head shaft arranged to be rotated by said flag rods, an indicating register adapted to be advanced by said proving head shaft, temperature responsive mechanism operatively connected between said proving head shaft and said indicating register for correcting the register for temperature change, said temperature responsive mechanism comprising a differential gear set including two sun gears together with intermediate planetary gears, means for driving one of said sun gears from said proving head shaft at a fixed or uncompensated ratio, temperature controlled means for driving the other sun gear from said proving head shaft at a rate or ratio which is governed by temperature, said temperature controlled means comprising a bimetallic spiral spring responsive to temperature and means for transmitting rotation from said planetary gears to said register.

(References on following page)

References Cited in the file of this patent

UNITED STATES PATENTS

| | | | |
|---|---|---|---|
| 1,923,356 | Diehl | Aug. 22, 1933 |
| 2,059,547 | Brandl | Nov. 3, 1936 |
| 2,222,551 | Ziebolz et al. | Nov. 19, 1940 |
| 2,348,593 | Beitler | May 9, 1944 |
| 2,469,673 | Whitmore | May 10, 1949 |
| 2,713,272 | Granberg | July 19, 1955 |
| 2,746,677 | Stone | May 22, 1956 |

FOREIGN PATENTS

| | | |
|---|---|---|
| 7,765 | Great Britain | 1912 |
| 614,238 | Germany | June 4, 1935 |